(12) United States Patent
Eiser et al.

(10) Patent No.: US 7,588,229 B2
(45) Date of Patent: Sep. 15, 2009

(54) ELECTROMAGNETIC VALVE

(75) Inventors: Armin Eiser, Rockenberg (DE); Marc Timmermans, Leerbeek (BE); Andre DeWitte, Ahrtselaar (BE); Luc Van Himme, Gentbrugge (BE); Bart Dewaele, Herent (BE)

(73) Assignee: Continental Teves AG & Co. oHG, Frankfurt (DE)

( * ) Notice: Subject to any disclaimer, the term of this patent is extended or adjusted under 35 U.S.C. 154(b) by 180 days.

(21) Appl. No.: 11/430,311

(22) Filed: May 4, 2006

(65) Prior Publication Data

US 2006/0261301 A1    Nov. 23, 2006

(30) Foreign Application Priority Data

May 6, 2005    (DE) .................. 10 2005 021 071
Dec. 22, 2005    (DE) .................. 10 2005 061 509

(51) Int. Cl.
*F16K 31/02* (2006.01)

(52) U.S. Cl. ................. 251/129.02; 251/129.15; 335/229

(58) Field of Classification Search ............ 251/129.02, 251/129.15; 335/299
See application file for complete search history.

(56) References Cited

U.S. PATENT DOCUMENTS

| 1,079,845 | A  | * | 11/1913 | Geissinger | ............... 123/190.1 |
| 5,076,323 | A  | * | 12/1991 | Schudt | .................. 137/596.17 |
| 6,598,623 | B2 | * | 7/2003 | Weldon | ................. 137/630.15 |
| 6,659,421 | B1 | * | 12/2003 | Goossens | .............. 251/129.02 |
| 7,331,564 | B2 | * | 2/2008 | Moreno et al. | ......... 251/129.02 |

FOREIGN PATENT DOCUMENTS

| DE | 19723782 | 12/1998 |
| DE | 19914971 | 3/2000 |
| DE | 10307060 | 9/2004 |
| DE | 10319632 | 12/2004 |

* cited by examiner

*Primary Examiner*—John K Fristoe, Jr.

(57) ABSTRACT

The magnetic coil (1) of an electromagnetic valve is held inside a yoke plate (2) by means of an appropriate component (3) and arranged inside the yoke plate (2) in a manner so that it can be rotated arbitrarily about the longitudinal axis of the valve housing (4).

5 Claims, 3 Drawing Sheets

ELECTROMAGNETIC VALVE

BACKGROUND OF THE INVENTION

The invention relates to an electromagnetic valve with a valve housing accommodating a valve closing element, which works in cooperation with a magnetic armature, where the valve closing element can be applied to a valve seat and the magnetic armature to a magnet core, with a magnet drive, which receives a magnet coil in a yoke plate, which coil is attached, together with the yoke plate, on the valve housing, to excite the magnetic armature.

In a known electromagnetic valve of the indicated type (DE 10 2004 039 843 A1), the magnet coil with the yoke plate forms a rigid unit, which is firmly connected to the valve housing.

In the application cases, where a particularly flexible electrical connection must be provided for the magnet coil, the known rigid attachment of the magnetic drive to the valve housing is not suitable.

The problem of the present invention, therefore, is to produce an electromagnetic valve which does not present the above-mentioned drawbacks.

This problem is solved according to the invention for an electromagnetic valve of the indicated type by providing that the magnet coil inside the yoke plate is held by means of an appropriate component in the yoke plate and arranged in a manner so it can be rotated arbitrarily in the yoke plate about the longitudinal axis of the valve housing.

Additional characteristics, advantages and application possibilities of the invention can be obtained from the description of two embodiment examples.

DETAILED DESCRIPTION OF THE DRAWINGS

Figure 1:
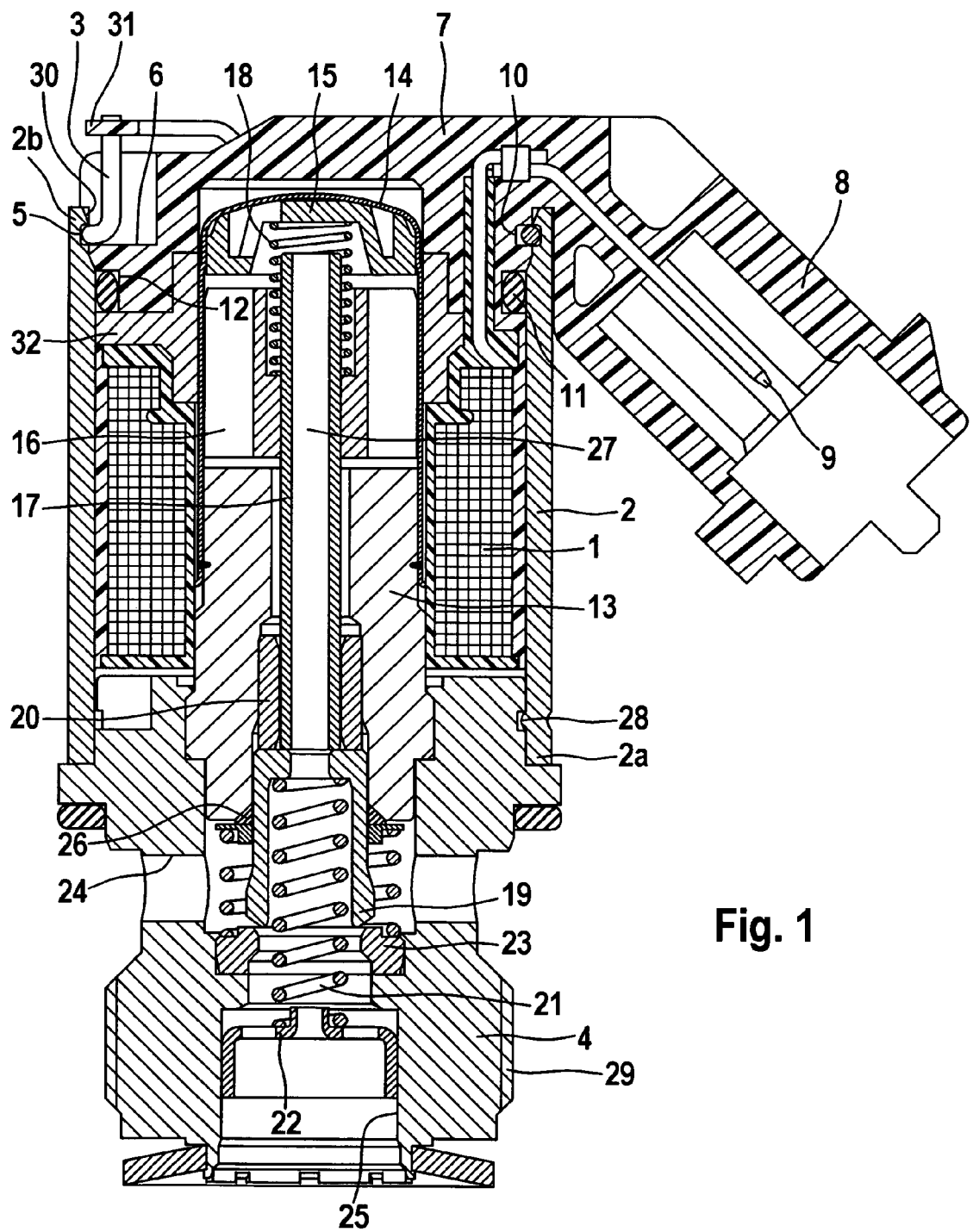
FIG. 1 shows an electromagnetic valve in longitudinal section in the functionally correct final assembly position of the magnetic drive on the valve housing.
Figure 2:
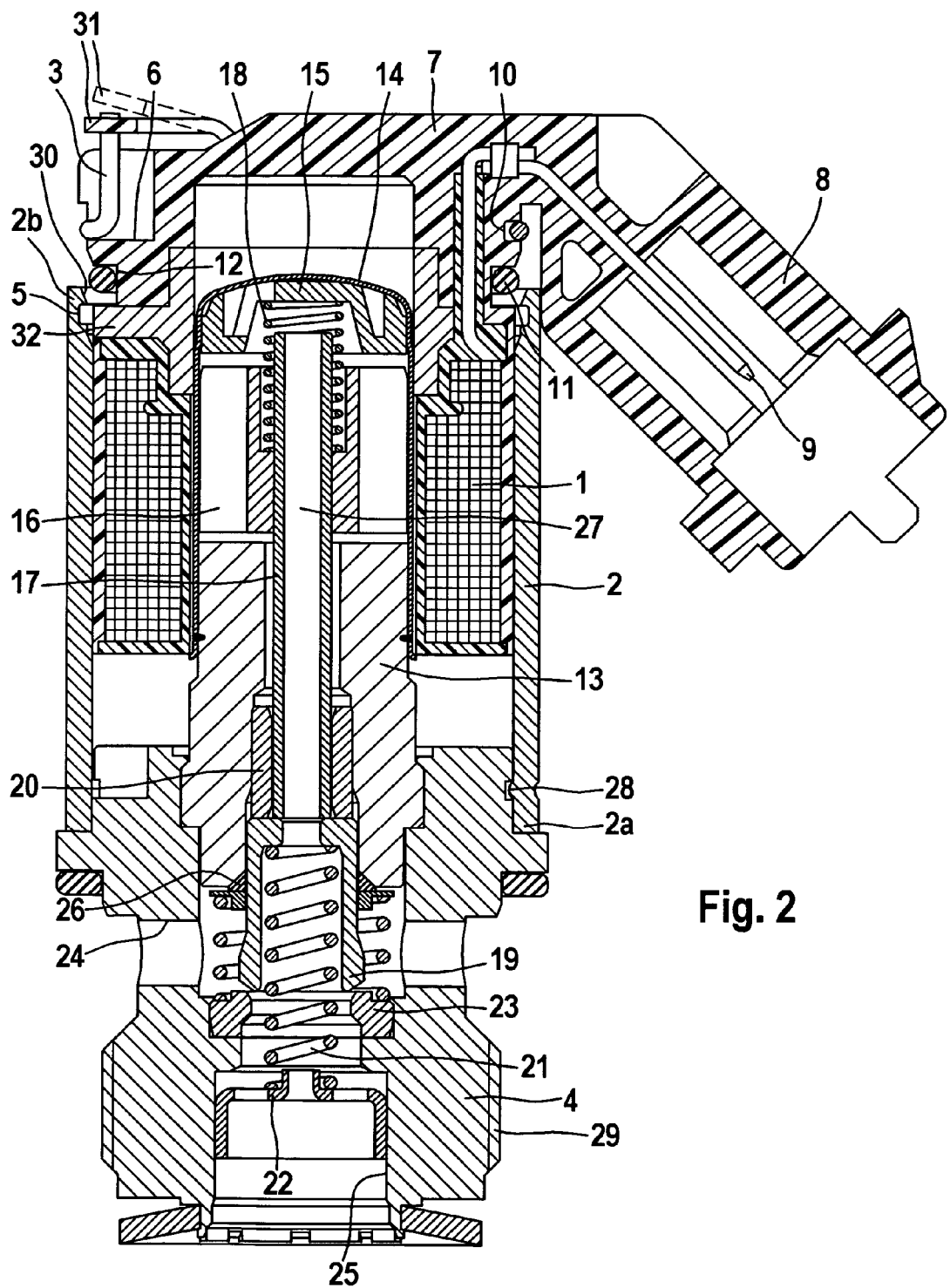
FIG. 2 shows, in contrast to FIG. 1, the magnetic drive at the beginning of the assembly, for the purpose of which the magnet coil is introduced into the yoke plate.
Figure 3:
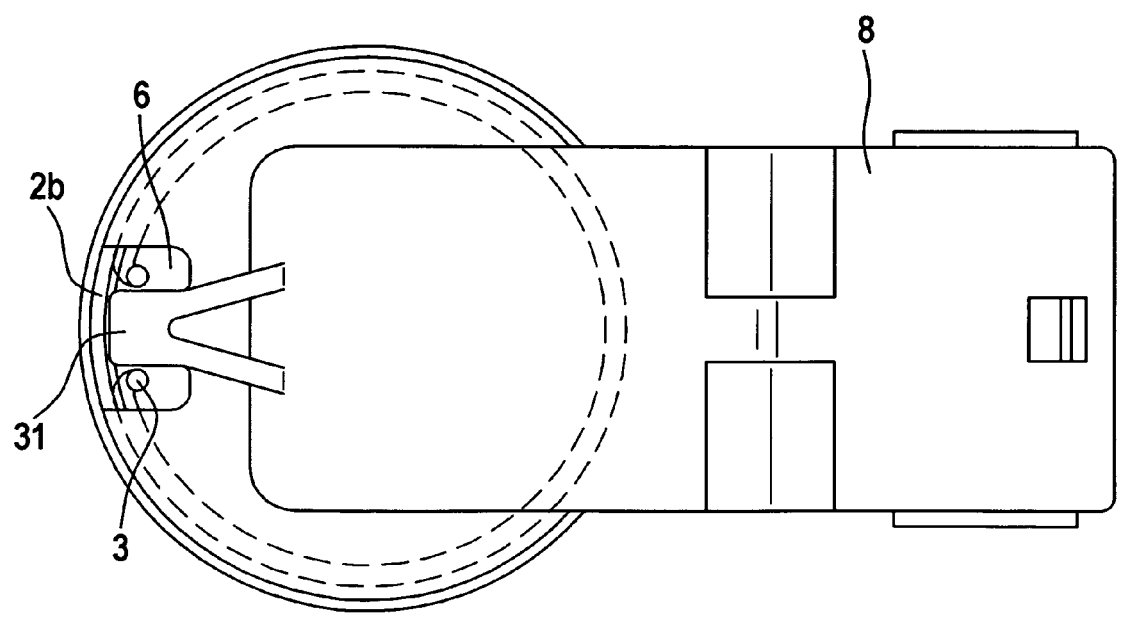
FIG. 3 shows a top view of the electromagnetic valve according to FIGS. 1, 2, in which the form-locking part embodied by a snap ring and the retaining element are clearly apparent.

The fundamental structure of the electromagnetic valve which is designed as a 2/2-way seat valve, and which is shown, for example, in the FIGS. 1, 2, is in each case apparent from a cross-sectional representation. The electromagnetic valve presents a valve housing 4, which is designed in a cartridge construction, and which is constructed, advantageously from the point of view of manufacturing technology, as a rotating part which is suitable for automated use. In the upper part of the valve housing 4, a tubular magnetic core 13 is inserted, which is fastened, for example, by means of an external riveting of the valve housing 4, in the valve housing in a fluid-proof manner. On the magnetic core 13, a sleeve 14 is set, which presents exceedingly thin walls and is manufactured preferably in the deep drawing process, with a cup-shaped closure in the end area; in its end area, the sleeve receives a solid end disk 15. The magnetic armature 16, which is arranged in a movable manner in the sleeve 14 under the end disk 15, is connected with a tubular valve tappet 17, which is preferably fastened by a press fit in the magnetic armature 16. Between the magnetic armature 16 and the end disk 15, a return spring 18 is located in the magnetic armature space, which spring is led in sections in the stepped bore to ensure a correct alignment. The connection, which consists of the magnetic armature 16 and the valve tappet 17, is followed by an also tubular valve closing element, whose external covering, like the covering of the valve tappet 17, is reliably introduced in sections in the centrally located continuous bore of the magnet core 13. For this purpose, the continuous bore is designed as a stepped bore, which, in the lower, expanded step section, receives the valve closing element 19 and a bushing 20. The bushing 20 is adapted, for the purpose of centering and guiding the tappet in the inner diameter, to the external diameter of the valve tappet 17. The external diameter of the bushing 20, on the other hand, to achieve a pressure connection, is adapted to the inner diameter in the expanded section of the stepped bore. The depths of pressure insertion of the bushing 20 in the magnet core 13 is chosen so that the desired lift for the valve closing element 19 can be regulated in a simple manner. The valve closing element 19, due to the action of a valve spring 21, rests against the front surface of the bushing 20, in the open, electromagnetically unexcited position. The valve spring 21 is advantageously subjected to preliminary pressure by means of a spring abutment 22, which is pressed from below into the opening of the valve housing 4, and which is accordingly also adjustable. The tubular shape of the valve closing element 19, which is deposited in the inner diameter, allows a secure, compact reception and supporting of the individual spring windings of the valve spring 21, without preventing the pressure compensation. The winding end, which is turned away from the valve closing element 19, is also centered by means of a mouth piece on the cap-shaped spring abutment 22, which is preferably produced by deep drawing from a thin metal plate. Above the spring abutment 22, an annular body is pressed in or held by riveting in the valve housing 4, where the annular body receives the valve seat 23 in the form of a conical sealing seat. The valve housing 4, at the height of the valve closing element 19 and thus above the valve seat 23, is penetrated horizontally by a pressurizing medium intake duct 24, which, in the open valve switch position of the illustration, is connected to the pressurizing medium outlet duct 25, which opens from below vertically into the valve housing 4.

In the present example, the electromagnetic valve pressure is hydraulically compensated, and, for that purpose, a concentric, spring-loaded sealing ring 26 is arranged on the valve closing element 19, which ring is pressed from below against the front surface of the magnet core 13. To reduce the hydraulic resistance, a pressure compensation bore 27 passes through the entire magnetic armature 16 parallel to the valve symmetry axis. The pressurizing medium, which flows into the pressurizing medium outlet and pressurizing medium intake duct 24, 25, respectively, can thus move, without obstacle, through the pressure compensation bore which passes through the valve closing element 19, the valve tappet 17 and the magnetic armature 16, and reach the magnetic armature space and thus the end area of the sleeve 14, so that, independently of the pressure and temperature difference of the fluids, a nearly unchanging switching characteristic of the electromagnetic valve is guaranteed advantageously.

FIG. 1 shows that the yoke plate 2, which receives the magnet coil 1, is pressed against the thick-walled cartridge section of the valve housing 4 and attached by so-called radial riveting 28 to the lateral surface of the valve housing 10. For this purpose, the covering surface presents a ring groove, into which the thin-walled yoke plate 2 is pressed at its lower, first sleeve end 2a with a riveting tool. Alternatively, the sleeve end 2a can be glued into place with a suitable adhesive.

Inside the yoke plate 2, a magnet coil 1 is located, which, according to the invention, is held by means of an appropriate component, and which is arranged inside the yoke plate 2 in such a manner that it can be rotated arbitrarily about the longitudinal axis of the valve housing 14 on the thin-walled sleeve section of the valve housing 4 (sleeve 14).

The component, which is used to position the magnet coil 1 in a rotatable manner, is designed as a form-locking part 3, and, for that purpose, it is preferred, in the present embodiment example, to use a snap ring, which is connected in a detachable manner, at a distance from the first sleeve end 2a of the yoke plate 2, to a second sleeve end 2b of the yoke plate 2.

For this purpose, the snap ring engages in a ring groove 5, which is molded on the second sleeve end 2b, and it is supported on an abutment surface 6 of the magnetic drive, which surface is arranged outside of the magnet coil 1, and which is formed, at least in sections, from a groove 10 which runs around a plastic molded body 7, to be able to securely receive the snap ring.

The abutment surface 6 is thus a component of the plastic molded body 7, which partially surrounds the magnet coil 1 as a plastic molded part, in which a magnetic terminal disk 32 is located, which is applied, in the area of the second sleeve end 2b, on the inner covering of the yoke plate 2.

The plastic molded body 7 presents a clip-shaped, plastically deformable retaining element 31, which, to prevent an unintended separation of the snap ring from the ring groove 5 of the yoke plate 2, is pressed, after the insertion of the spring ring into the groove nut 5, into the open end area of the spring ring.

The plastic molded body 7 is shaped on the side to form a plug housing 8, which receives an electrical plug contact 9, which is connected to the magnet coil 1, and which can be connected to an electronic valve control device.

The plastic molded body 7, the magnetic termination disk 32 and the magnet coil 1 form a stand-alone component which can be handled manually and subjected to a preliminary test, and on which component the snap ring embodying the form-locking part 3 can be preinstalled for the simple positioning of the magnetic drive on the yoke plate 2.

To prevent the penetration of humidity from outside into the yoke plate 2, a sealing ring 11 is arranged, at a distance between the magnetic termination disk 32 and the ring groove 5, between the plastic molded body 7 and the yoke plate 2.

FIG. 2, in contrast to FIG. 1, shows the stand-alone component which can be handled manually, at the time of the insertion in the yoke plate 2. The representation here functions to illustrate the sealing ring 21, which has already been preinstalled on the plastic molded body 7, and the snap ring, where, to simplify the installation (in a manner which is suitable for automation) of the above-mentioned parts of the component, the second sleeve end 2b presents, in the area of the ring groove 5, an insertion slope 30, which expands in the shape of a funnel.

Because the magnet coil 1 can be rotated arbitrarily inside the yoke plate 2, the desired orientation of the plug contact 9 for connecting the magnet coil 1 to the valve control apparatus can be achieved at all times. The fact that the magnet coil 1 can be rotated arbitrarily is extremely advantageous, particularly if the valve housing 4 for attachment in a valve reception body is provided with a drive screw thread 29, because otherwise, in the conventional rigid connection of the magnet coil 1 to the yoke plate 2, the lateral final position of the plug contact 9 is left to chance after the required drive screw torque has been reached.

Although only the design of the form-locking part 3 as a snap ring is explicitly presented here, other form-locking elements are naturally also conceivable, such as, for example, commercial (standardized) wire rings or retaining rings, retaining disks or also a snap-fit attachment.

A snap-fit attachment can be produced, for example, immediately on the circumference of the plastic molded body 7 by molding on snap-fits or snap-latches, which engage in the ring groove 12 instead of the depicted snap ring.

| Parts list | |
|---|---|
| 1 | Magnet coil |
| 2 | Yoke plate |
| 2a | Sleeve end |
| 2b | Sleeve end |
| 3 | Formlocking part |
| 4 | Valve housing |
| 5 | Ring groove |
| 6 | Abutment surface |
| 7 | Plastic melded body |
| 8 | Plug housing |
| 9 | Plug contact |
| 10 | Groove |
| 11 | Sealing ring |
| 12 | Ring groove |
| 13 | Magnetic core |
| 14 | Sleeve |
| 15 | End disk |
| 16 | Magnetic armature |
| 17 | Valve tappet |
| 18 | Return spring |
| 19 | Valve closing element |
| 20 | Bushing |
| 21 | Valve spring |
| 22 | Spring abutment |
| 23 | Valve seat spring |
| 24 | Pressurizing medium intake duct |
| 25 | Pressurizing medium outlet duct |
| 26 | Sealing ring |
| 27 | Pressure compensation bore |
| 28 | Radial riveting |
| 29 | Drive screw threading |
| 30 | Insertion bevel |
| 31 | Securing element |
| 32 | Magnet termination disk |

What is claimed is:

1. An electromagnetic valve, with a valve housing, which receives a valve closing element, which works in cooperation with a magnetic armature, where the valve closing element can be applied to a valve seat and the magnetic armature to a magnet core, with a magnet drive, which receives a magnet coil in a yoke plate, wherein the yoke plate (2) is sleeve-shaped and is rigidly attached to the valve housing (4) at one end (2a) and carries a plastic molded body (7), which surrounds the coil (1) inside the yoke plate (2), wherein the coil (1) is arranged inside the plastic molded body, wherein the coil (1) and the plastic molded body (7) are rotatable with respect to the yoke plate, and wherein the molded body (7) accommodates a magnetic termination disc (32), which is in contact with the coil and with the inside surface of the yoke plate (2), wherein the molded body is secured in the yoke plate with a snap ring (3), which is supported between a ring groove (5) provided in the second sleeve end (2b) of the yoke plate, and an abutment surface (6) of the molded body, which surface is arranged outside of the magnet coil (1), wherein the plastic molded body (7) comprises a retaining element (31), which is connected to the yoke plate (2) and is engaged with the snap ring (3).

2. The electromagnetic valve according to claim 1, wherein the plastic molded body (7) is shaped to form a plug housing (8), which receives an electric plug contact (9), which is connected with the magnet coil (1).

3. The electromagnetic valve according to claim 1, wherein the plastic molded body (7), the magnetic termination disk (32) and the magnet coil (1) form a pre-assembled component.

4. The electromagnetic valve according to claim 1, wherein the plastic molded body (7) is provided with a groove (10), in which the snap ring (3) is held.

5. The electromagnetic valve according to claim 4, wherein a ring groove (12) is arranged at a distance between the magnetic termination disk (32) and the groove (10) in the molded body to receive a sealing ring (11) in the plastic molded body (7), which arrangement prevents the penetration of humidity from outside into the yoke plate (2).

* * * * *